United States Patent Office 2,993,702
Patented July 25, 1961

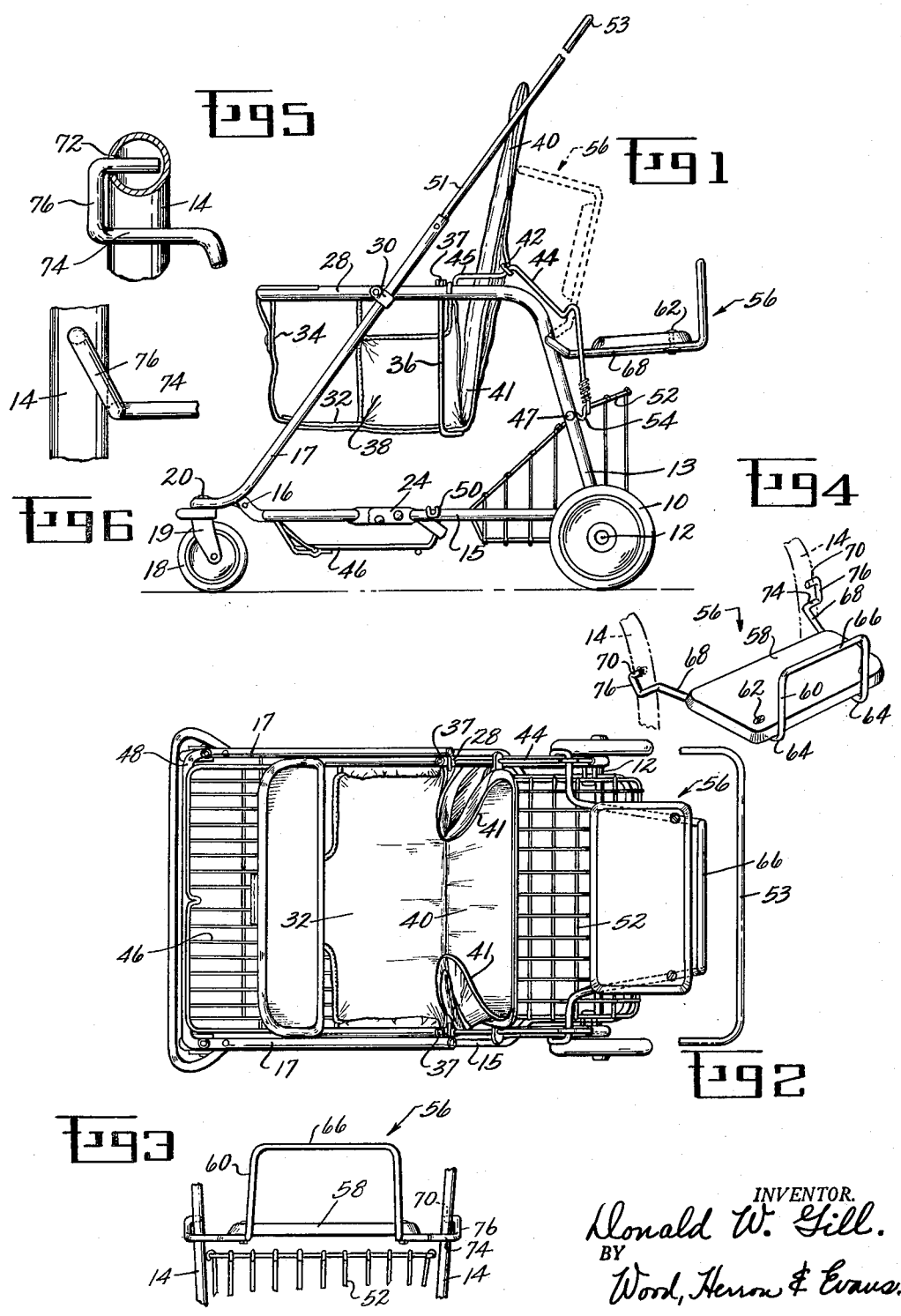

2,993,702
TWOSOME WALKER-STROLLER
Donald W. Gill, Cincinnati, Ohio, assignor to The Frank F. Taylor Company, Cincinnati, Ohio, a corporation of Ohio
Filed Apr. 14, 1958, Ser. No. 728,254
3 Claims. (Cl. 280—41)

This invention relates to a walker-stroller and is particularly directed to a four-wheeled walker-stroller having a frame, a seat mounted on the frame above the four wheels and a tandem seat pivotally and detachably supported at the rear of the frame.

A typical walker-stroller of the type to which the present invention is directed is described and illustrated in co-pending application Serial No. 667,421, filed June 24, 1957 now Patent No. 2,917,316. Such a walker-stroller includes four wheels mounted on generally upwardly extending legs, the legs being joined together to form a frame. A seat is suspended from the frame above the wheels, and a foot board is mounted on a lower portion of the frame so that a child, sitting in the seat, can rest his feet above ground. To add utility to strollers of this type, a basket is detachably mounted at the rear of the walker-stroller to receive groceries, children's toys, and the like when the woman of the house takes her child for a walk.

Many families have two children of such tender years that they are unable to walk unassisted. Accordingly, to add even greater utility to the walker-stroller, the present invention provides a tandem seat mounted at the rear of the walker-stroller on which the older of two children, or even a twin child, can be seated.

It has been the objective of the invention to provide a tandem seat which is detachably mounted to the rear legs or rear portion of the frame of a walker-stroller.

It has been another objective of the invention to provide such a tandem seat so juxtaposed with respect to the rear mounted basket that the basket forms a footboard for the child riding in the tandem seat.

In view of the importance of being able to collapse walker-strollers for storage or the like, it has been another objective of the invention to cantilever the tandem seat from a pivotal mounting on the rear part of the stroller, the pivotal mounting permitting the tandem seat to be pivoted into a collapsed position so that the tandem seat will not increase appreciably the space required for storing a completely assembled walker-stroller unit.

These and other objectives of the invention will become more readily apparent from the following detailed description taken in conjunction with the accompanying drawings in which:

FIGURE 1 is an elevational view of the complete assembly;

FIGURE 2 is a top plan view of the assembly;

FIGURE 3 is a fragmentary elevational view;

FIGURE 4 is a perspective view of the tandem seat; and

FIGURES 5 and 6 are detailed views of the cantilever pivotal support.

The principal support members of the walker-stroller include the rear wheels 10 mounted on an axle 12 fixed in the lower portion 13 of a pair of rear legs 14. Horizontal frame members 15 are pivoted respectively at their rear ends to the axle 12 and are pivoted at their front ends at 16 to front legs 17. Front wheels 18 are journalled in brackets 19 which are mounted on vertical pivots 20 on the forward legs 17. The horizontal frame members 15 are hinged intermediate their ends at 24 to permit the walker-stroller to be collapsed.

The rear leg 14 has at its upper end a U-shaped horizontal extension 28 which is pivotally joined to the forward leg 17 as at 30. The pivotal connection 30, cooperating with the hinge 24 and pivotal end connection of frame members 15, permits the stroller to be collapsed by breaking the hinge joint and bring the front and rear wheels together.

A seat 32 is suspended from the horizontal extension 28 by a strap 34 at the front thereof and by a U-shaped member 36 which is bolted at 37 to the horizontal member 28 at each side thereof and extends across the bottom of the seat 32 to form a principal support member. Side panels 38 and a fabric covered adjustable back 40 joined by gussets 41 complete the seat structure. A cross bar 42 cooperating with a pair of adjustable back mounts 44 connected at one end 45 to extension 28 and at the other end 47 to the leg 14 permits the back 40 to be shifted through several reclining positions.

A wire foot board 46 is supported at a front portion thereof on a transverse member 48 which joins the lower extremities of the legs 17 and at the rear end thereof by hooks 50 resting on the horizontal member 15.

A U-shaped handle has its legs 51 slidably received in front legs 17 which are constructed from tubular stock, the legs being formed at the top by a cross bar 53. Suitable locking means permit the handle to be fixed in an extended, operating position, or in a telescoped, collapsed position.

A wire basket 52 is supported near its rear portion on the adjustable back mounts 44. This support consists of downwardly directed U-shaped projections 54 at each side which hook over the lower extremity of the back mount 44 adjacent the point of connection of the back mount to the rear leg 14. Support of the basket 52 is completed by resting the bottom portion thereof on axle 12.

Insofar as the present invention is concerned, the walker-stroller thus far described differs in no material respect from that shown in co-pending application Serial No. 667,421. The present invention is directed to the structure of a tandem seat indicated at 56 which includes two principal members, namely a seat board 58 and a U-shaped support 60 joined together by bolts 62. The generally U-shaped member 60 has a right angle bend at 64 to project the bight portion 66 upwardly, forming a back for the seat. The extremity of each leg 68 of the U-shaped support 60 includes a hinge-forming projection 70, or pivot pin portion, which extends into a hole 72 in the leg 14, and a bracing section 74. The hinge-forming projection and the bracing section are joined by a pivotal hook section 76.

When the hinge-forming projections are disposed in their respective holes 72, the bracing sections bear against the surface of the legs 14, providing a cantilever support to maintain the seat 58 in a generally horizontal attitude. The holes 72 are positioned on the upper portion of legs 14 to located the seat 56 in such a position that a child sitting in the seat will be able to rest his feet in the basket 52, which thereby performs the dual function of a container for goods and a foot board. There is sufficient space between the forward edge of the seat 58 and the surrounding walker-stroller structure to permit the child to sit and move freely.

When the handle legs 51 are extended, there is ample room between the seat and handle crossbar 53 joining legs 51 for even a fairly tall young child to sit on the seat without interference from the handle. In fact, the legs 51 of the handle form excellent hand grips by which the child can steady himself.

As indicated in FIGURE 1, in its operating position illustrated in solid lines, seat 56 projects rearwardly of the remaining walker-stroller structure. However, as indicated in broken lines, the seat 56 may be pivoted upwardly so that all parts lie within the confines of a vertical projection of the walker-stroller structure. Thus, for the purpose of storage, the seat can be pivoted upwardly when the remaining walker-stroller structure is folded into collapsed position, and the seat will not appreciably increase the space required for storing the complete unit. Because the legs 14 diverge slightly in an upward direction, the pivot hook sections 76 press frictionally against the outer surface of the legs and restrain the seat against its tendency to swing downwardly. The collapsibility of the walker-stroller structure generally is illustrated in Patent No. 2,798,733.

The legs 68 of support 60 are fairly stiff but have enough resiliency that, with comparatively little effort, they can be spread for either the attaching or detaching of the seat from the holes 72 in legs 14.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

I claim:

1. A rear seat for a walker-stroller having two generally vertical, spaced frame members, said rear seat comprising, a seat board, and a generally U-shaped rod having pivot hooks at each end removably mounted in holes formed in said generally vertical members, said U-shaped rod extending rearwardly under said seat board and having the bight portion thereof turned upwardly to form a back for said seat.

2. A rear seat for a walker-stroller having two generally vertical, spaced frame members, said rear seat comprising a seat board, a pair of resilient forwardly projecting rods fixed to said seat board, hooks on the extremities of said rods, cooperating with said frame members to cantilever said seat rearwardly of said frame members, said frame members having holes to receive said hooks for upward pivotal movement, and said frame members diverging slightly above said hooks to frictionally grip said hooks when said seat has been pivoted upwardly.

3. A walker-stroller according to claim 2 in which each said hook comprises an inwardly directed projection which enters the holes in said frame members, a bracing section extending parallel to said projection and engageable with the rear surface of said frame member, and an intermediate section joining said projection and said bracing section, said intermediate section forming with said diverging frame members a frictional grip to support said seat in elevated collapsed position.

References Cited in the file of this patent

UNITED STATES PATENTS

| | | |
|---|---|---|
| D. 166,822 | Peterson | May 20, 1952 |
| 508,726 | Lange | Nov. 14, 1893 |
| 958,307 | Plourde | May 17, 1910 |
| 1,217,658 | Stoltz | Feb. 27, 1917 |
| 1,235,347 | Lutostanski | July 31, 1917 |
| 2,558,372 | Nidermayer | June 26, 1951 |
| 2,670,216 | Leonard | Feb. 23, 1954 |
| 2,711,328 | Shone | June 21, 1955 |
| 2,770,488 | Kuniholm | Nov. 13, 1956 |
| 2,783,896 | Agostini | Mar. 5, 1957 |
| 2,798,733 | Gill | July 9, 1957 |
| 2,857,953 | Berger | Oct. 28, 1958 |